ROBERTO LEVI
INVENTOR.

BY
ATTORNEY

Patented Mar. 22, 1949

2,465,105

UNITED STATES PATENT OFFICE 2,465,105

OXIDE INSULATING COATING FOR NICKEL CHROMIUM RESISTANCE WIRE

Roberto Levi, New York, N. Y., assignor, by mesne assignments, to Philips Laboratories, Inc., Irvington on Hudson, N. Y., a corporation of Delaware Application April 12, 1946, Serial No. 661,675

7 Claims. (Cl. 148—6.30)

The invention relates to an inorganic electrically insulating coating and a method of manufacturing the same. The invention is particularly directed to electrically insulating oxide coatings for wires containing nickel and chromium and will be described in connection with such wires.

It is an object of the invention to provide a novel inorganic insulating coating having good insulating properties which properties are maintained at high temperatures and under severe operating conditions.

A further object of the invention is to provide a novel inorganic insulating coating for an electrical conducting base comprising substantial amounts of nickel and chromium.

Another object of my invention is to produce an inorganic electrical insulation having good dielectric properties for wires containing nickel and chromium.

Still another object of my invention is to produce a non-hygroscopic insulation for wires containing nickel and chromium which insulation does not deteriorate with age.

Another object of my invention is to produce a heat resistant insulation for wires containing nickel and chromium.

A further object of my invention is to provide a nickel-chromium-iron alloy wire element having an integrally bonded, electrically insulating, flexible covering produced by oxidizing a copper coating on the wire element under controlled conditions hereinafter to be more specifically set forth.

These and further objects of the invention will appear as the specification progresses.

According to the invention, an electrically conducting base containing nickel and chromium and preferably also iron is initially provided with a copper coating. Such a coating may be formed on the wire element by an electrodeposition process, i. e., by electroplating in a suitable electroplating bath containing a solution of a salt of copper. The so coated wire is thereafter heat treated under controlled conditions of temperature and treating atmosphere whereby the said copper coating is oxidized and forms on the wire a coating of copper oxide having heretofore unattainable electrically insulating properties.

I have found that to produce the novel and highly satisfactory insulating coating according to the invention, the copper coating initially deposited on the nickel-chromium base must be at least 0.2 microns thick. Furthermore, the subsequent heat treating of the coated base must take place in an oxidizing atmosphere and at a temperature of at least about 1026° C. I have further found this temperature is critical and that heat treating at temperatures below the above noted value do not produce the insulating coating according to the invention for the reasons later to be more fully explained.

The insulating coating so formed has a dull black finish, resists peeling, is non-hygroscopic, resists deterioration with age, is heat resistant, and has excellent dielectric insulating properties.

In order that the invention may be more clearly understood and readily carried into effect, I shall describe the same in more detail with reference to the accompanying drawing in which.

Figure 1:
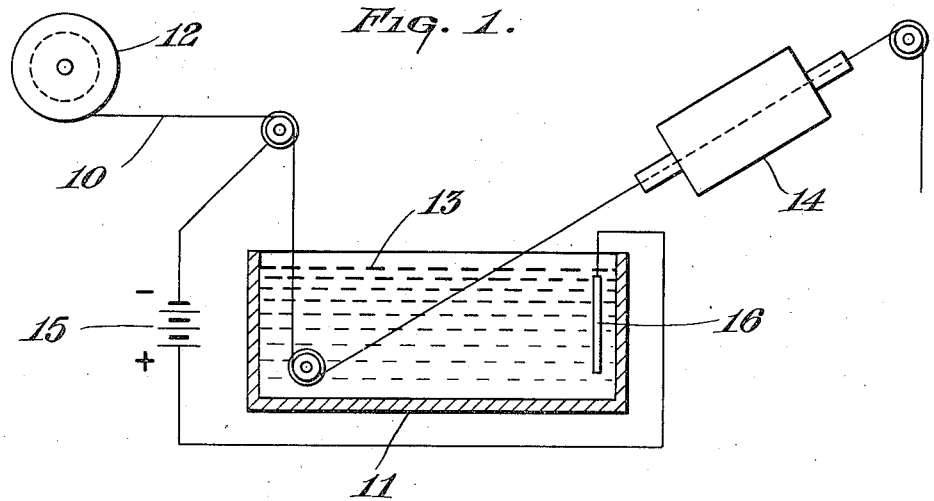
Fig. 1 shows one form of apparatus for producing a copper coated wire element suitable for the invention.

Referring to Fig. 1, a wire element 10 containing nickel, chromium, and iron, i. e. a wire, 0.010 inch in diameter consisting of an alloy of 60 percent of nickel, 15 percent of chromium, and the remainder substantially iron is passed into an electroplating cell 11, from a reel 12, in which a copper coating is electrically plated on the wire. A plating solution consisting for example of 200 grams per liter of crystalline copper sulfate ($CuSO_4.5H_2O$) and 23 cubic centimeters per liter of sulfuric acid ($H_2SO_4$) having a specific gravity of 1.84 is contained in the plating cell 11, and agitated by means of a stirrer (not shown). The positive pole of battery 15 is connected to a copper anode 16 while the negative pole is electrically connected to the wire 10. The plating solution is preferably maintained at a temperature of 25° C. to 35° C. By passing the wire through the cell at a speed of about 2 meters per minute with about 1.25 meters immersed in the plating solution and at a current of 850 milliamperes, a copper coating having a weight approximately 2 percent of the weight of the wire is formed. The copper coated wire is thereafter annealed in an oven 14 at a temperature of 750° C. in a deoxidized and dry hydrogen atmosphere.

Preferably the copper coated wire is subjected to one or more drawing operations which reduces the diameter of the wire to approximately 0.002 inch. The drawing step reduces the thickness of the coating to about 0.2 micron when the wire itself is drawn to 0.00175 inch in diameter. The foregoing mentioned drawing step, I have found, makes the copper coating uniform over the surface of the wire, and improves the structure of the copper, thereby leading subsequently to an improved oxide insulating covering.

Figure 2:
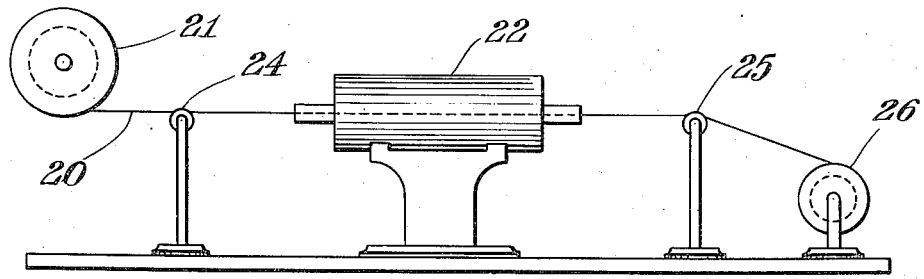
Fig. 2 shows one form of apparatus for heat treating the copper coated wire element to produce thereon an insulating coating in accordance with the invention.

In Fig. 2, the copper coated wire 20 shown as wound on a reel 21 is passed through the heat treating oven 22 in which the copper coating is converted to the highly insulating coating of the invention. Guide wheels 24 and 25 are provided to prevent the wire from scraping against the wall of the oven. The wire after leaving the oven 22 is wound on spool 26 driven from a suitable source of power. The oven 22 is maintained at a temperature of approximately 1035° C. whereby the coated wire is maintained at a temperature of at least about 1026° C. It is found that a satisfactory coating is formed when the wire passes through the oven 22 at a rate of about 6 meters per minute with about 0.8 meter of wire in the oven. Higher temperatures may be used, in which case, the treating time may be reduced. However, the upper treating temperature is limited to that temperature at which the wire becomes brittle, and for this reason, I prefer not to exceed a temperature of 1055° C. when the speed of the wire and the oven length thereof is as above stated. When the wire passes through the oven at a rate of 30 meters per minute with about 0.8 meter of wire in the oven, the above oven temperature may be 1070° C. in which case I prefer not to exceed 1080° C. to prevent brittleness of the wire.

Figure 3:
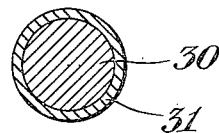
Fig. 3 illustrates a cross-section view of a coated wire element in accordance with the invention.

A coated wire element made in accordance with the above described process is shown in Fig. 3 wherein a wire element 30 is provided with a coating 31 composed of copper oxide interbonded with the core and the chromium and nickel oxides on the core formed by the process of the invention. The insulating coating is securely bonded to the wire core and withstands 90 volts or better over a wide temperature range.

The breakdown voltage of the coating so produced, in general, depends upon the thickness of the copper coating applied to the wire. I have found that a wire 0.00175 inch in diameter in which a copper coating of 0.2 micron is converted to copper oxide has a breakdown voltage greater than 90 volts and this breakdown voltage value is maintained throughout a large temperature range.

This breakdown voltage was obtained by laying a length of wire across two metal drums each approximately three inches in diameter and spaced one-half inch apart and electrically insulated with respect to each other. In order to insure good contact between the wire and the drums, a weight of 50 grams is suspended from each end of the wire. The two drums are connected to a source of voltage in series with a voltage adjusting means and a voltmeter. The voltage between the drums is adjusted until the voltmeter shows a noticeable movement. The breakdown voltage is then measured by replacing the insulated wire by a suitable conductor of negligible resistance across the drums and measuring the voltage across the voltage adjusting means with the voltmeter.

The wall thickness of the copper coating prior to the oxidizing heat treatment should be at least 0.2 micron in order that an insulating coating having uniform and reproducible characteristics may be achieved.

The improved characteristics of the coating of the invention over heretofore proposed coatings are believed to be due to the fact that in heat treating the coated conductor at a temperature in excess of about 1026° C. cuprous oxide is formed from initially formed cupric oxide coating, which transformation releases nascent oxygen.

The reaction may be formulated as follows:

$$2CuO + \Delta \rightarrow Cu_2O + O \uparrow$$

If the heat treating temperature is not maintained greater than about 1026° C., I have found that the above reaction is reversible to a greater or lesser extent and the desired coating is not formed.

Furthermore at temperatures above about 1026° C., the nascent oxygen released by the cupric oxide layer nearest the nickel-chromium core, being chemically active, unites with the nickel and chromium in the core to form a layer of nickel-chromium oxides. This layer of nickel-chromium oxides integrally bonds the copper oxide to form a highly adherent flexible coating and together with copper oxide formed at this temperature accounts for the outstanding electrical properties realized.

It should be well understood that while in the foregoing description the copper coating is applied to the wire element by electroplating, other methods of applying the coating are equally suitable. For example, the coating may be applied mechanically, i. e., by a metal cladding process.

While I have described my invention with specific examples and specific applications, I do not wish to be limited thereto, but desire the appended claims to be construed as broadly as permissible in view of the prior art. In the claims, the word "wire" is to be broadly construed to include ribbons, straps or strips.

What I claim is:

1. In the manufacture of insulated wire elements containing approximately 60 percent of nickel, approximately 15 percent of chromium, and the remainder substantially iron the process comprising electrodepositing on the wire element a layer of copper having a thickness greater than 0.2 micron, annealing said copper coated wire element in a dry deoxidized hydrogen atmosphere at a temperature of approximately 750° C., wire drawing said coated wire to produce a uniform layer of copper having a wall thickness of about 0.2 micron, and heating said copper coated element in an oxidizing atmosphere having a temperature greater than about 1026° C. and less than about 1075° C.

2. A process of manufacturing an insulated electrical wire element having a diameter of less than about 10 mils and having a core consisting essentially of nickel and chromium, comprising the steps of forming a uniform copper coating on said wire element having a thickness of the order of microns and at least 0.2 of a micron thick and heating said copper coated wire element in an oxidizing atmosphere to a temperature greater than 1026° C. and less than 1080° C., thus forming an insulating coating of oxides of copper, nickel and chromium on said wire element.

3. A process of manufacturing an insulated electrical wire element having a diameter of less than about 10 mils having a core consisting essentially of nickel and chromium, comprising the steps of electrodepositing a uniform copper coating on said wire element having a thickness of the order of microns and at least 0.2 of a micron thick and heating said copper coated wire element in an oxidizing atmosphere to a temperature greater than 1026° C. and less than 1080° C., thus forming an insulating coating of oxides of chromium, nickel and copper on said wire element.

4. A process of manufacturing an insulated electrical wire element having a diameter of less than about 10 mils having a core consisting essentially of nickel and chromium, comprising the steps of electrodepositing a copper layer on said wire element having a thickness of the order of microns, drawing the wire element to reduce the thickness of the copper layer to a uniform copper layer having a thickness of about 0.2 of a micron and heating the copper coated wire element in an oxidizing atmosphere to a temperature greater than 1026° C. and less than 1080° C., thus forming an insulating coating of oxides of chromium, nickel and copper on said wire element.

5. A process of manufacturing an insulated electrical wire element having a diameter of less than about 10 mils and having a core consisting essentially of approximately 60 per cent of nickel, approximately 15 per cent of chromium, and the remainder substantially iron, comprising the steps of electrodepositing a copper layer on said wire element having a thickness of the order of microns, drawing the wire element to reduce the thickness of the copper layer to a uniform copper layer having a thickness of about 0.2 of a micron and heating the copper coated wire element in an oxidizing atmosphere to a temperature greater than 1026° C. and less than 1080° C., thus forming an insulating coating of oxides of copper, chromium, and nickel on said wire element.

6. An insulated wire element consisting essentially of a core of nickel and chromium, and an insulating coating on said core consisting essentially of oxides of nickel, chromium and copper formed by oxidizing the core at a temperature between 1026° C. and 1080° C. with a uniform layer of copper thereon having a thickness of the order of microns and at least 0.2 of a micron thick.

7. An insulated wire element consisting essentially of a core of approximately 60 per cent of nickel, 15 per cent of chromium, and the remainder substantially iron, and an insulating coating on said core consisting essentially of oxides of nickel, chromium and copper formed by oxidizing the core at a temperature between 1026° C. and 1080° C. with a uniform layer of copper thereon having a thickness of the order of microns and at least 0.2 of a micron thick.

ROBERTO LEVI.

REFERENCES CITED

The following references are of record in the file of this patent:

UNITED STATES PATENTS

| Number | Name | Date |
|---|---|---|
| 1,545,127 | Christ | July 7, 1925 |
| 1,919,806 | Schulz | July 25, 1933 |
| 1,978,265 | Ivins et al. | Oct. 23, 1934 |
| 2,036,425 | Mayoral | Apr. 7, 1936 |
| 2,097,298 | Meyers | Oct. 26, 1937 |
| 2,151,933 | Ono et al. | Mar. 28, 1939 |
| 2,276,647 | Conrad et al. | Mar. 17, 1942 |
| 2,369,146 | Kingston | Feb. 13, 1945 |

OTHER REFERENCES

"Metals Handbook," 1939 ed., Amer. Soc. for Metals, Cleveland, Ohio, page 1170.